United States Patent
Papenfuhs

(10) Patent No.: US 6,984,690 B2
(45) Date of Patent: Jan. 10, 2006

(54) HIGH-MOLECULAR-WEIGHT CROSS-LINKED POLYVINYL BUTYRALS, THEIR USE, AND PROCESS FOR THEIR PREPARATION

(75) Inventor: Bernd Papenfuhs, Obertshausen (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 11 days.

(21) Appl. No.: 10/670,757

(22) Filed: Sep. 26, 2003

(65) Prior Publication Data

US 2005/0101729 A1 May 12, 2005

Related U.S. Application Data

(63) Continuation of application No. PCT/EP02/03218, filed on Mar. 22, 2002.

(30) Foreign Application Priority Data

Mar. 28, 2001 (DE) ................ 101 15 222

(51) Int. Cl.
*C08L 29/04* (2006.01)
(52) U.S. Cl. .............. 524/503; 524/557; 525/58; 525/61; 525/383; 525/385
(58) Field of Classification Search ............. 524/503, 524/557; 525/58, 61, 383, 385
See application file for complete search history.

(56) References Cited

U.S. PATENT DOCUMENTS

| | | | | |
|---|---|---|---|---|
| 2,448,260 A | | 8/1948 | Flodin | |
| 5,179,171 A | * | 1/1993 | Minami et al. | 525/288 |
| 5,268,490 A | * | 12/1993 | Hann et al. | 549/304 |
| 5,389,597 A | * | 2/1995 | Hann et al. | 503/227 |
| 5,512,621 A | * | 4/1996 | Pastor et al. | 524/119 |
| 5,516,920 A | * | 5/1996 | Nesvadba et al. | 549/307 |
| 5,852,090 A | * | 12/1998 | Meier et al. | 524/324 |

FOREIGN PATENT DOCUMENTS

| | | |
|---|---|---|
| DE | 43 30 354 | 3/1995 |
| EP | 0 211 818 | 2/1987 |
| EP | 0 211 819 | 2/1987 |
| EP | 0 891 989 | 1/1999 |

OTHER PUBLICATIONS

US 5,955,619, 09/1999, Nesvadba et al. (withdrawn)

* cited by examiner

*Primary Examiner*—Bernard Lipman

(74) *Attorney, Agent, or Firm*—Tyler A. Stevenson

(57) ABSTRACT

The present invention relates to high-molecular-weight crosslinked polyvinyl butyrals obtainable by crosslinking a polyvinyl butyral with benzofuranone and/or with at least one derivative of the same, as crosslinking reagent, to their use, and to a process for their preparation.

12 Claims, No Drawings

HIGH-MOLECULAR-WEIGHT CROSS-LINKED POLYVINYL BUTYRALS, THEIR USE, AND PROCESS FOR THEIR PREPARATION

This application is a Continuation of International Application PCT/EP02/03218 with an International filing date of Mar. 22, 2002, which claims the benefit of priority of German Application Serial No. 101 15 222.1 filed Mar. 28, 2001; the entire contents of which are incorporated herein by reference.

The present invention relates to novel, high-molecular-weight, crosslinked polyvinyl butyrals, to their use, and to a process for their preparation.

It is known that polyvinyl butyrals can be processed together with plasticizers by extrusion to give films, which are in particular used to produce laminated safety glass.

To increase the molecular weight of these polyvinyl butyrals, EP-A-0 211 818 proposes crosslinking polyvinyl butyrals via stable intermolecular diacetal linkages. This crosslinking takes place via aldehydes having at least two aldehyde groups. The crosslinker here is added prior to or during the acetalization of the polyvinyl alcohols with butyraldehyde.

However, due to the high reactivity of the aldehydes, the crosslinking of polyvinyl butyrals with dialdehydes leads to polyvinyl butyrals which are of very high molecular weight and are therefore to some extent insoluble. In addition, low selectivity means that the crosslinking reaction is difficult to control, and the preparation of products of reproducible quality is therefore very difficult.

It is an object of the present invention, therefore, to provide polyvinyl butyrals which have greater mechanical strength than uncrosslinked products but which nevertheless can still be prepared reproducibly.

Surprisingly, it has been found that high-molecular-weight polyvinyl butyrals can be prepared reproducibly via crosslinking with benzofuranone or with derivatives of the same.

These compounds are normally used as stabilizers for various polymers, where they effectively reduce molecular weight degradation as a result of thermal or mechanical stress. However, the fact that they actually counteract the degradation of the molecular weight by increasing the same and therefore are suitable crosslinking additives is completely novel and moreover entirely unexpected.

The present invention therefore provides high-molecular-weight, crosslinked polyvinyl butyrals obtainable by crosslinking a polyvinyl butyral with benzofuranone and/or with at least one derivative of the same as crosslinking reagent.

Preferred crosslinking reagents are compounds of the formula (I)

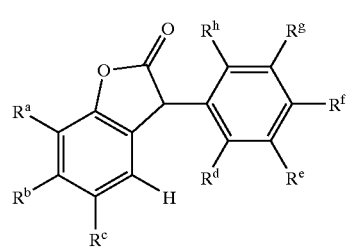

(I)

where $R^a$, $R^b$, $R^d$, $R^e$, $R^f$, $R^g$ and $R^h$ independently of one another are hydrogen, hydroxy, $C_1$–$C_{18}$-alkyl, unsubstituted or $C_1$–$C_4$-alkyl-mono-, -di-, or -trisubstituted phenyl, $C_7$–$C_9$-phenylalkyl, unsubstituted or $C_1$–$C_4$-alkyl-mono-, -di-, or -tri substituted $C_5$–$C_{12}$-cycloalkyl, or $C_1$–$C_{18}$-alkoxy, and $R^c$ is as defined above for $R^a$, $R^b$, $R^d$, $R^e$, $R^f$, $R^g$ and $R^h$ or is a radical of the formula (II)

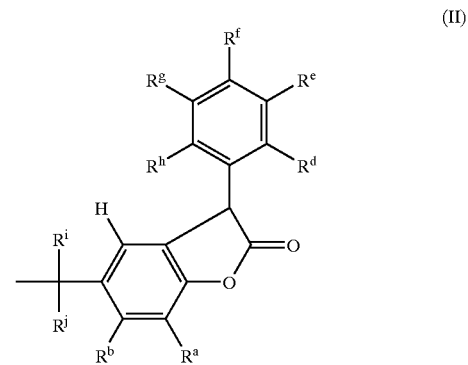

(II)

where $R^a$, $R^b$, $R^d$, $R^e$, $R^f$, $R^g$ and $R^h$ are as defined above and $R^i$ and $R^j$ independently of one another are hydrogen or $C_1$–$C_4$-alkyl, at least two of the radicals $R^d$, $R^e$, $R^f$, $R^g$ and $R^h$ being hydrogen.

Particularly preferred crosslinking reagents are compounds of the formula (I) where
$R^b$ is hydrogen, and/or
$R^d$—$R^h$ are hydrogen, and/or
$R^a$ and $R^c$ are $C_1$–$C_{18}$-alkyl, in particular tert-butyl, or unsubstituted or $C_1$–$C_4$-alkyl-mono-, or -trisubstituted phenyl.

If $R^c$ is a radical of the formula (II), then $R^i$ and $R^j$ are preferably both methyl.

It is not possible to state the structural unit which provides the linkage of the polyvinyl butyral molecules to one another, since the mechanism of crosslinking by means of benzofuranone derivatives is unknown.

The polyvinyl butyrals of the invention have markedly greater mechanical strength than conventional products.

Starting materials which may be used are any of the polyvinyl butyrals known to the skilled worker, i.e. there is absolutely no restriction on the molecular weight of the starting polyvinyl butyrals. However, it is preferable to use polyvinyl butyrals with a molar mass of at least 50,000 g/mol. The polyvinyl alcohol contents of the polyvinyl butyrals used as starting materials are preferably from 10 to 25% by weight, and particularly preferably from 16 to 23% by weight. The polyvinyl acetate contents of the polyvinyl butyrals used as starting materials are preferably from 0 to 20% by weight.

In one preferred embodiment, the high-molecular-weight, crosslinked polyvinyl butyrals prepared according to the invention comprise plasticizer or plasticizer mixtures. The plasticizers used here may be any of the plasticizers known to the skilled worker, in particular esters of polybasic acids, of polyhydric alcohols, or of oligoether glycols. Examples of preferred plasticizers are diesters of aliphatic diols, and also those of aliphatic polyetherdiols or of polyether polyols, with aliphatic carboxylic acids, preferably diesters of polyalkylene oxides, in particular diesters of di-, tri-, or tetraethylene glycol with aliphatic or aromatic ($C_6$–$C_{12}$) carboxylic acids, or else diesters of aliphatic or aromatic ($C_2$–$C_{18}$) dicarboxylic acids with aliphatic ($C_4$–$C_{12}$) alcohols, preferably dihexyl adipate, or else a mixture of the esters mentioned. The amounts of the plasticizers used here are those known to the skilled worker, and the preferred plasticizer content is from 25 to 80 parts by weight, based on 100 parts by weight of PVB.

The present application therefore also provides a process for preparing the polyvinyl butyrals of the invention, which comprises adding the crosslinking reagent, and also, where appropriate, the plasticizer to the polyvinyl butyral, where appropriate homogenizing the mixture, and crosslinking thermally at temperatures in the range from 80 to 280° C.

In one preferred embodiment, the crosslinking is catalyzed by alkaline or acidic additives.

Examples of alkaline or acidic additives which may be used are the hydroxides, alkanoates, carboxylates, sulfates, chlorides, nitrates, or phosphates of alkali metals and/or of alkaline earth metals, free organic and/or inorganic acids, and also amines.

One preferred embodiment is used below to give more detailed description of the preparation of the high-molecular-weight, crosslinked polyvinyl butyrals of the invention, but the preparation is not restricted to this embodiment.

The crosslinking reagent may, for example, have been dissolved in the plasticizer and then be added to the polyvinyl butyral, and the mixture may then be homogenized.

The concentration of the crosslinking reagent here is preferably in the range from 0.001 to 2.0% by weight, particularly preferably in the range from 0.005 to 1.0% by weight, and in particular in the range from 0.01 to 0.5% by weight, based in each case on polyvinyl butyral.

The thermal crosslinking may be carried out in any of the heatable assemblies known to the skilled worker, e.g. kneaders or autoclaves. However, the crosslinking preferably takes place in an extruder, and indeed preferably at melt temperatures in the range from 80 to 280° C.

The crosslinking reaction is promoted by the polymer's alkalinity, this usually being established so as to stabilize the polyvinyl butyral.

The present application also provides a molding composition comprising the high-molecular-weight, crosslinked polyvinyl butyral of the invention.

The extrusion process described can also process the polyvinyl butyral of the invention directly to give a film, with the aid of a slot die. Processes for producing polyvinyl butyral films are well known to the skilled worker. Films made from the high-molecular-weight, crosslinked polyvinyl butyrals of the invention may also comprise other conventional additives, e.g. antioxidants, UV stabilizers, dyes, pigments, and also release agents.

The present application therefore also provides a film comprising the high-molecular-weight, crosslinked polyvinyl butyral of the invention.

The films have increased tensile stress at break, and this is particularly advantageous for producing laminated safety glass, the main application sector for the films.

The present invention also provides the use of the films of the invention for producing laminated safety glass.

Examples are used below to describe the invention in detail, but the invention is not restricted to these.

Test Methods

Polyvinyl Alcohol Content of PVB

For this test, the PVB is acetylated with an excess of acetic anhydride in pyridine. After the reaction, water is used to hydrolyze the excess acetic anhydride, and the resultant acetic acid is titrated potentiometrically with sodium hydroxide solution. PVOH content is calculated from the consumption of sodium hydroxide solution.

Polyvinyl Acetate Content of PVB

For this test, the PVB is dissolved in a benzyl alcohol/ethanol mixture. The acetyl groups are saponified using an excess of alcoholic potassium hydroxide solution. The excess potassium hydroxide solution is back-titrated with hydrochloric acid. Polyvinyl acetate content is calculated from the consumption of hydrochloric acid.

Alkaline Titer of PVB

For this test, the PVB is dissolved in ethanol and titrated with 0.01 molar hydrochloric acid until the color changes from green to violet. The indicator used is a mixture of methylene blue and neutral red. The alkaline titer is calculated from the consumption of hydrochloric acid.

Mw, Mn

The molecular weights of the polyvinyl butyrals present in the molding compositions are determined by gel permeation chromatography (GPC), using RI detectors. The detectors are calibrated using PVB calibration standards whose absolute values are determined by static light scattering. The value measured is given in g/mol.

Tensile Stress at Break

Prior to measurement of tensile stress at break, the films are conditioned for 24 hours at 23° C. and 50% relative humidity. Tensile stress at break is measured using a machine for testing tensile and compressive strength (manufacturer: Cadis GbR, model: BRP 201) to DIN 53455. The values measured are given in N/mm².

Melt Index

Prior to measurement of melt index, the films are conditioned for 24 hours at 23° C. and 50% relative humidity. The films are tested using a melt index test device (manufacturer: Göttfert, model MP-D) at 190° C. with a load of 2.16 kg using a 2 mm die to ISO 1133. The values measured are given in g/10 min.

EXAMPLES AND COMPARATIVE EXAMPLES

Mixing and Extrusion

Polyvinyl butyrals (PVBs) which are typical for the production of films for laminated safety glass production (analytical parameters see below) are mixed, prior to extrusion, with the plasticizer triethylene glycol di-n-heptanoate (manufacturer: Celanese AG). This process takes place in a Brabender laboratory mixer (model 826801).

In the inventive examples, a certain amount of the crosslinking reagent of the invention is also dissolved in the plasticizer prior to preparation of the mixture. The PVB/plasticizer mixtures are used to extrude flat films of thickness 0.8 mm. For all of the examples and comparative examples, the extrusion processes take place in a twin-screw extruder with counterrotating screws (manufacturer: Haake), equipped with melt pump and slot die, the melt temperature being 190° C.

Examples 1, 2 and 3, and also Comparative Example 4

In each case, use is made of 370 g of PVB (polyvinyl alcohol content=20.9% by weight, polyvinyl acetate content=1.1% by weight, alkaline titer=13 ml of 0.01 M HCl/100 g of PVB, Mw=104,200 g/mol, Mn=53,600 g/mol), and 130 g of triethylene glycol di-n-heptanoate.

The crosslinker (see below) used and its concentration (data in ppm, based on PVB), and the values measured on the resultant films are given in Table 1.

Examples 5, 6 and 7, and also Comparative Example 8

Using a similar method to that for Examples 1, 2 and 3, and also Comparative Example 4 (in each case the same PVB/plasticizer mixing ratio), the polyvinyl butyral used has the following analytical parameters: Polyvinyl alcohol content 20.4% by weight, polyvinyl acetate content=0.9% by weight, alkaline titer=24 ml of 0.01 M HCl/100 g of PVB, Mw=103,400 g/mol, Mn=53,200 g/mol.

The crosslinking reagents tested can be described by the formula (I) (C: $R^a$ and $R^c$=tert-butyl, all other radicals=hydrogen; A: as C, but $R^e$ and $R^f$=methyl; B: as C, but $R^f$=methyl): A=5,7-di-tert-butyl-3-(3,4-dimethylphenyl)-3H-benzofuran-2-one B=5,7-di-tert-butyl-3-(4-methylphenyl)-3H-benzofuran-2-one C=5,7-di-tert-butyl-3-phenyl-3H-benzofuran-2-one

TABLE 1

| Example | Crosslinker | Crosslinker concentration | Tensile stress at break | Melt index | Mw | Mn |
|---|---|---|---|---|---|---|
| 1 | A | 500 ppm | 30.06 | 1.93 | 111800 | 55900 |
| 2 | B | 500 ppm | 29.70 | 2.02 | 109300 | 55500 |
| 3a | C | 500 ppm | 30.23 | 1.78 | 113400 | 56100 |
| 3b | C | 1000 ppm | 30.57 | 1.57 | 117700 | 55300 |
| 3c | C | 2000 ppm | 30.75 | 1.45 | 119500 | 55100 |
| 4 | — | — | 28.12 | 2.88 | 102600 | 53400 |
| 5 | A | 500 ppm | 30.13 | 1.86 | 112500 | 55700 |
| 6 | B | 500 ppm | 29.95 | 1.96 | 111000 | 56100 |
| 7a | C | 500 ppm | 30.48 | 1.69 | 115200 | 56700 |
| 7b | C | 1000 ppm | 30.79 | 1.42 | 119900 | 55300 |
| 7c | C | 2000 ppm | 31.07 | 1.23 | 122300 | |
| 8 | — | — | 27.83 | 2.95 | 101800 | 53300 |

The examples demonstrate that PVB can be crosslinked thermally with benzophenone derivatives. The increase in molecular weight via the action of the crosslinking reagents is discernible from the increase in the weight-average Mw, and also from the decrease of the melt index values. The crosslinking reaction is promoted by increasing the concentration of the crosslinker (see Examples 3a–c and 7a–c), and also, it appears, by increasing the alkaline titer (see differences between Examples 1–3 and 5–7). The crosslinking reaction brings about an improvement in mechanical properties of films produced from the molding compositions, discernible from an increase in tensile stresses at break.

What is claimed is:

1. A crosslinked polyvinyl butyral obtained by a process which comprises
    adding at least one crosslinking reagent selected from the group consisting of benzofuranone and the benzofuranone derivatives, to a polyvinyl butyral and
    crosslinking the polyvinyl butyral thermally at temperatures in the range from 80 to 280° C.,
    wherein the crosslinked polyvinyl butyral exhibits an increased molecular weight.

2. The polyvinyl butyral as claimed in claim 1, wherein the crosslinking reagents are of the formula (I)

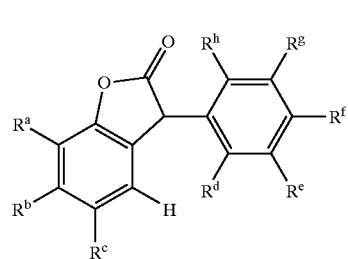

(I)

wherein $R^a$, $R^b$, $R^d$, $R^e$, $R^f$, $R^g$, and $R^h$ independently of one another are hydrogen, hydroxy, $C_1$–$C_{18}$-alkyl, unsubstituted or $C_1$–$C_4$-alkyl-mono-, -di-, or trisubstituted phenyl, $C_7$–$C_9$-phenylalkyl, unsubstituted or $C_1$–$C_4$-alkyl-mono-, -di-, or trisubstituted $C_5$–$C_{12}$-cycloalkyl, or $C_1$–$C_{18}$-alkoxy, and $R^c$ is as defined above for $R^a$, $R^b$, $R^d$, $R^e$, $R^f$, $R^g$ and $R^h$ or is a radical of the formula (II)

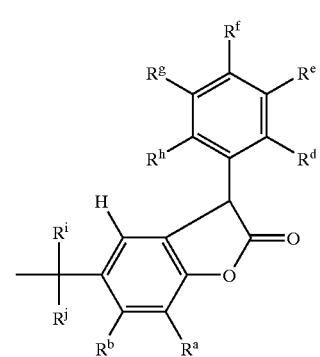

(II)

where $R^a$, $R^b$, $R^d$, $R^e$, $R^f$, $R^g$ and $R^h$ are as defined above and $R^i$ and $R^j$ independently of one another are hydrogen or $C_1$–$C_4$-alkyl, at least two of the radicals $R^d$, $R^e$, $R^f$, $R^g$ and $R^h$ being hydrogen.

3. The polyvinyl butyral as claimed in claim 2, wherein the crosslinking reagents are of the formula (I), where
    $R^b$ is hydrogen, and/or
    $R^d$–$R^h$ are hydrogen, and/or
    $R^a$ and $R^c$ are $C_1$–$C_{18}$-alkyl, or unsubstituted or $C_1$–$C_4$-alkyl-mono-, -di-, or trisubstituted phenyl.

4. The polyvinyl butyral as claimed in claim 2 wherein the crosslinking reagents are of the formula (I) where $R^c$ is a radical of the formula (II) and $R^i$ and $R^j$ are methyl.

5. The polyvinyl butyral as claimed in claim 1 which comprises plasticizers.

6. A process for preparing a crosslinked polyvinyl butyral, which process comprises
    adding at least one crosslinking reagent selected from the group consisting of benzofuranone and the benzofuranone derivatives, and also, where appropriate, a plasticizer to a polyvinyl butyral,
    where appropriate homogenizing the mixture and
    crosslinking the polyvinyl butyral thermally at temperatures in the range from 80 to 280° C.,
    wherein the crosslinked polyvinyl butyral exhibits an increased molecular weight.

7. The process as claimed in claim 6, wherein the crosslinking is catalyzed by addition of alkaline or acidic additives.

8. The process as claimed in claim 6, wherein the thermal crosslinking is carried out in an extruder.

9. A molding composition comprising the crosslinked polyvinyl butyral as claimed in claim 1.

10. A film comprising the crosslinked polyvinyl butyral as claimed in claim 1.

11. A laminated safety glass comprising a film according to claim 10.

12. The process as claimed in claim 7, wherein the thermal crosslinking is carried out in an extruder.

* * * * *